No. 636,446. Patented Nov. 7, 1899.
N. H. NORBY.
COW MILKER.
(Application filed Feb. 1, 1899.)
(No Model.)
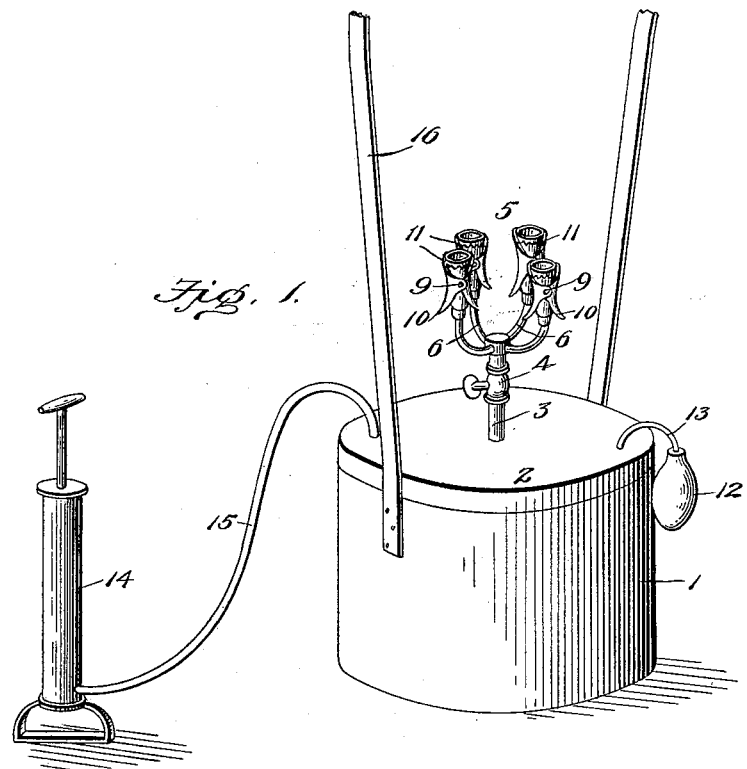
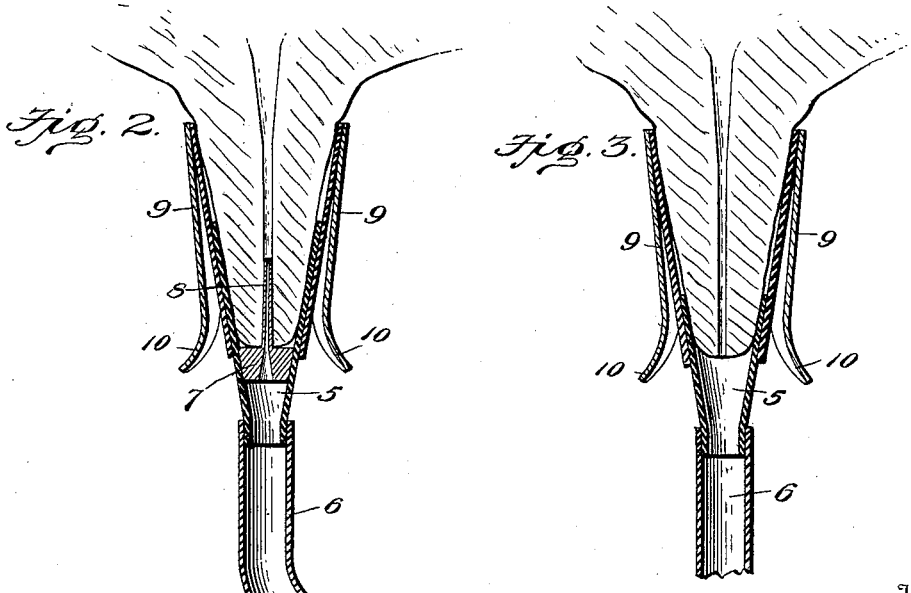

UNITED STATES PATENT OFFICE.

NELS H. NORBY, OF COOLEYSVILLE, MINNESOTA.

COW-MILKER.

SPECIFICATION forming part of Letters Patent No. 636,446, dated November 7, 1899.

Application filed February 1, 1899. Serial No. 704,143. (No model.)

*To all whom it may concern:*

Be it known that I, NELS H. NORBY, a citizen of the United States, residing at Cooleysville, in the county of Steele and State of Minnesota, have invented certain new and useful Improvements in Cow-Milkers; and I do declare the following to be a full, clear, and exact description of the invention, such as will enable others skilled in the art to which it appertains to make and use the same.

The invention has relation to cow-milkers, and more particularly to that class of devices in which a vacuum is established in a vessel for drawing the milk from the cow.

Among the objects of the invention is to provide means for indicating the breaking of the vacuum; furthermore, to provide means for securely retaining the cup on the teat, and, finally, to provide a simple, durable, and inexpensive device of this character which will perform its work in an efficient manner.

In the drawings, Figure 1 is a perspective view of the complete apparatus. Fig. 2 is a sectional view through the teat-cup and the holder, showing the device applied to the animal and the hollow needle extending through the duct in the teat into the udder, said needle being used only in cases where the animal refuses to let down the milk. Fig. 3 is a similar view showing the needle and its plug removed.

In the drawings, 1 denotes the milk-receptacle, having an air-tight cap 2. The material of which the receptacle is formed is of sufficient strength to withstand the atmospheric pressure when a vacuum is made within the receptacle.

3 denotes a short tube leading from the top of the receptacle and provided with a cut-off cock 4 and with teat-cups 5. These cups are preferably formed of hard rubber and are connected to the upper end of the pipe by the short flexible tubes 6.

7 denotes a plug having a hollow needle 8. This plug is adapted to have an air-tight connection with the teat-cup, and the needle is adapted to pass through the canal of the teat into the udder, and thereby drain the same of its milk. This needle and plug are only used in cases where the cow becomes obstinate and refuses to let down the milk. In ordinary cases I do not employ the plug with its needle, but attach the teat-cup directly to the teat, the vacuum maintained through the receptacle being sufficient to withdraw the milk from the udder. In either case it is desirable to provide some means other than the force of the vacuum to hold the teat-cup in engagement with the teat, for a sudden movement or twist of the cow's body would tend to disconnect the cup from the teat, and in order to overcome this objection I provide what I shall term a "teat-holder," which consists of a flexible sheath, conical at its lower end, to snugly embrace the lower end of the teat-cup. Secured to the upper end of the sheath are the upper ends of pivoted jaws of the clamp 9, provided with handles 10. By compressing the handles the upper enlarged end of the rubber sheath will be stretched, and in this position may be readily slipped over the teat, and when the pressure is removed from the handles the upper end of the sheath will draw itself tightly around the teat. In order to secure additional holding means other than the elasticity of the rubber, I may provide springs 11, the energy of which is exerted to force the upper ends of the jaws together.

12 denotes an elastic bulb connected to the receptacle by a tube 13. When the air has been exhausted from said receptacle, it is likewise exhausted from the bulb, which then collapses. Should there be a leak in the tank or when the tank becomes filled with milk to supply the vacuum, this bulb will expand, thus indicating that the vacuum has been broken either by the charging of the tank or receptacle with milk or by a leak due either to the poor condition of the receptacle and the joints of the pipes therewith or the imperfect connection of the teat-cups with the animal.

14 denotes an exhaust air-pump which may be of any well-known or approved construction, and 15 denotes a flexible tube connecting said pump with the receptacle.

The air-tight receptacle may be allowed to rest upon the ground while the cow is being milked or it may be suspended from the cow by a strap 16, which passes around the back of the cow.

It will of course be understood that various changes in the form, proportion, and the minor details of construction may be resorted to without departing from the spirit or sacrificing any of the advantages of this invention.

Having thus described the invention, what I claim, and desire to secure by Letters Patent, is—

In a cow-milker, the combination of the airtight receptacle provided with an exhaust air-pump connected therewith by a flexible tube, an elastic bulb connected with said air-tight receptacle by a flexible tube, a short rigid tube leading from the top of said receptacle, a cut-off cock seated in said short rigid tube below its upper end, short flexible tubes connected to and communicating with the upper end of said short rigid tube, teat-cups upon the upper ends of said short flexible tubes, flexible sheaths conical at the lower ends embracing the lower portions of said teat-cups, and clamps comprising spring-actuated pivoted jaws provided with handles for compressing said teat-cups after they have been expanded to adjust them to the cow's teats, substantially as specified.

In testimony whereof I have hereunto set my hand in presence of two subscribing witnesses.

NELS H. NORBY.

Witnesses:
   IVER ANDERSON,
   WM. OGROSKY.